United States Patent [19]

Ogawa et al.

[11] Patent Number: 4,890,133
[45] Date of Patent: Dec. 26, 1989

[54] AUTOFOCUS CAMERA

[75] Inventors: Ryota Ogawa, Kawagoe; Shigeo Toji; Kazushi Yoshida, both of Tokyo; Zenichi Okura, Ichikawa, all of Japan

[73] Assignee: Asahi Kogaku Kogyo K.K., Tokyo, Japan

[21] Appl. No.: 280,586

[22] Filed: Dec. 6, 1988

Related U.S. Application Data

[63] Continuation of Ser. No. 173,753, Mar. 25, 1988, abandoned.

[30] Foreign Application Priority Data

Mar. 26, 1987 [JP] Japan .................................. 62-73827

[51] Int. Cl.$^4$ .............................................. G03B 3/00
[52] U.S. Cl. .................................. 354/402; 354/195.11
[58] Field of Search ............... 354/400, 402, 406, 407, 354/408, 195.1, 195.11, 195.12

[56] References Cited

U.S. PATENT DOCUMENTS

| | | | |
|---|---|---|---|
| 4,168,116 | 9/1979 | Goldberg | 354/195.1 |
| 4,182,563 | 1/1980 | Biber | 354/197 |
| 4,473,287 | 9/1984 | Fukuhara | 354/409 |
| 4,547,663 | 10/1985 | Kitagishi | 354/406 |
| 4,602,861 | 7/1986 | Taniguchi | 354/403 |
| 4,716,431 | 12/1987 | Shindo | 354/407 |

FOREIGN PATENT DOCUMENTS

| | | |
|---|---|---|
| 29-108628 | 8/1954 | Japan . |
| 30-111928 | 8/1955 | Japan . |
| 32-93326 | 6/1957 | Japan . |
| 32-150808 | 9/1957 | Japan . |
| 34-208514 | 11/1959 | Japan . |

Primary Examiner—Russell E. Adams
Attorney, Agent, or Firm—Sandler & Greenblum

[57] ABSTRACT

In an autofocus camera, at least one lens of a photographing lens system serves as a focus lens which is reciprocatively moved by a drive unit along a predetermined optical path. A detector detects a position of the focus lens in the lens system. On the basis of the detected position, a calculator calculates a correction amount of a spherical aberration of the lens system. A controller controls the drive unit on the basis of the calculated correction amount so as to cause the drive unit to move the focus lens to a position where the spherical aberration of the lens system is corrected.

21 Claims, 2 Drawing Sheets

AUTOFOCUS CAMERA

This is a continuation, of application Ser. No. 173,753 filed Mar. 25, 1988 now abandoned.

Background of the Invention

This invention relates to an autofocus camera, and more particularly, to a spherical aberration correcting system for use in an autofocus camera, capable of correcting a spherical aberration (deviation or shift of an in-focus position) in a narrow sense, which varies depending upon a position of the focus lens which moves along an optical path in response to the distance to a subject to be photographed.

An autofocus camera is known which utilizes a phase difference detecting method (correlation method) to detect the in-focus position. In such autofocus camera, the focus position is detected with an F-number set to a large value in order to enhance interchangeability of lens systems, that is, in order also enable lens systems having large F-numbers to be used. A motor for driving the focus lens along the optical path is controlled on the basis of a focusing signal indicative of the detected in-focus position, in order to carry out automatic focusing.

Since, in the autofocus camera, the motor is controlled on the basis of the focusing signal indicative of the in-focus position detected at the large F-number, the influence of a spherical aberration of the lens system causes a deviation or shift between the position indicated by the focusing signal value and the actual in-focus position. In consideration of such deviation, a system has been developed in which a given correction is applied to the focusing signal value to correct the deviation. Since, however, the spherical aberration of the lens system varies depending upon the position of the focus lens, it is impossible for the uniform or fixed correction to sufficiently correct the deviation of the in-focus position. After all, a deviation or shift occurs in the in-focus position depending upon the position of the focus lens, making it impossible to obtain clear or sharp photographs.

SUMMARY OF THE INVENTION

It is therefore an object of the invention to provide an improved autofocus camera capable of correcting a spherical aberration of a lens system which varies depending upon the position of the focus lens and other factors, thereby making it possible to obtain clear or sharp photographs which are always in accurate focus.

For the above purpose, according to the invention, there is provided an autofocus camera comprising:

a photographing lens system including at least one focus lens reciprocatively movable along a predetermined optical path;

drive means for reciprocatively moving said focus lens along said optical path;

means for detecting a position of said focus lens and for outputting a signal representative of position information;

means for calculating, on the basis of said position information outputted from said position detecting means, a correction amount with respect to a spherical aberration of said lens system at said detected position in order to output a signal representative of the calculated correction amount; and control means for controlling said drive means on the basis of the signal from said calculating means so as to cause said drive means to move said focus lens to a position where the spherical aberration of said lens system is corrected.

DESCRIPTION OF THE ACCOMPANYING DRAWINGS

FIG. 1 is a diagramattic view of an autofocus camera embodying the invention; and FIG. 2 is a flow chart of a program stored in a ROM incorporated in a microcomputer shown in FIG. 1.

DESCRIPTION OF THE EMBODIMENTS

Figure 1:
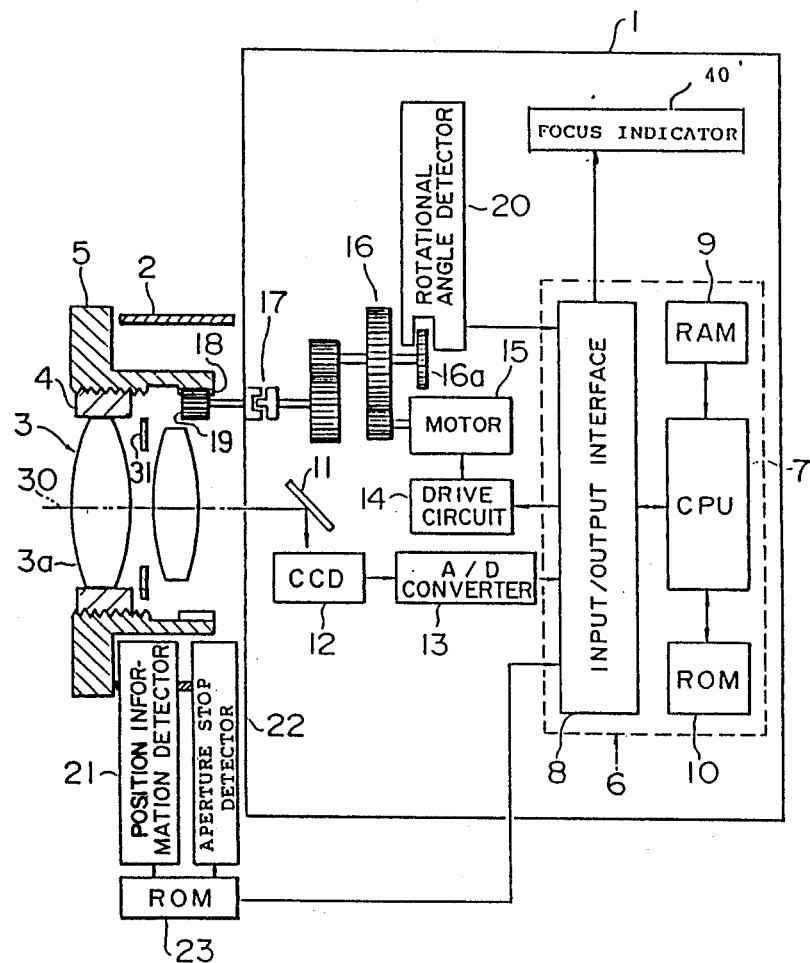

As illustrated in FIG. 1, an autofocus camera embodying the invention comprises a camera body 1 and a lens-barrel 2 detachably mounted to the camera body 1. A photographing lens system 3 having a plurality of lenses is incorporated in the lens-barrel 2. At least one of the lenses remote from the camera body 1 serves as a focus lens 3a which is reciprocatively movable along a predetermined optical path 30. The focus lens 3a is fixedly secured to a movable lens frame 4 which is threadedly engaged with a rotatable focus ring 5. As the focus ring 5 rotates about the optical path 30, the lens frame 4 as well as the focus lens 3a carried thereon is reciprocatively moved along the optical path 30 without rotation of the lens frame 4 relative to the focus ring 5, to thereby effect focusing adjustment. An aperture stop 31 is arranged within the lens barrel 2 in a known manner for setting an aperture of the lens system 3.

The camera body 1 has incorporated therein a microcomputer 6 which comprises a CPU (central processing unit) 7, an input/output interface 8, a RAM (random access memory) 9 and a ROM (read only memory) 10. These components 8, 9 and 10 are connected to the CPU 7.

An auxiliary mirror 11 for autofocus photometry is mounted within the camera body 1 for pivotal movement together with a finder main mirror, not shown. A solid state image pickup device such as, for example, a CCD (charge coupled device) 12 is arranged on the optical path 30 which is reflected from the auxiliary mirror 11. The CCD 13 is connected to the input/output interface 8 through an A/D (analog/digital) converter 13. The arrangement is such that an output signal from the CCD 12 is converted into a digital signal by the A/D converter 13, and the converted digital signal is inputted to CPU 7 through the input/output interface 8. The CPU 7 executes focusing calculation in a known manner such as, for example, the phase difference detecting manner.

The input/output interface 8 has an output terminal which is connected to a drive circuit 14 which is in turn connected to a motor 15 serving as means for driving the focus lens 3a to reciprocatively move the same along the optical path 30. The motor 15 has an output shaft which is connected to a coupling 17 through a gear train 16. Connected to the coupling 17 is a pinion 19 which is in mesh with gear teeth 18 formed on an inner peripheral surface of the lens-barrel 2. Thus, as the motor 15 rotates, the rotation is transmitted to the focus ring 5 through the gear train 16, the coupling 17 and the pinion 19, whereby the focus ring 5 rotates to reciprocatively move the focus lens 3a along the optical path 30. On the other hand, a known rotational angle detector 20 connected to the input/output interface 8 is associated with a gear 16a of the gear train 16, for detecting the rotational angle of the gear 16a to output a detection signal as a pulse signal. The output signal from the detector 20 is inputted to the CPU 7 through the input-/output interface 8. By the arrangement described above, autofocus adjustment is carried out in a known manner.

A position information detector 21 is arranged within the lens-barrel 2 in the vicinity of the focus ring 5, for detecting the rotational angle of the focus ring 5 in, for example, eight steps to thereby determine the position of the focus lens 3a. Any one of digital signals 1-8 is outputted from the position information detector 21 in, for example, such a manner that when the focus lens 3a is positioned at its infinite side, a position information signal N=1 is outputted, while when the focus lens 3a is positioned at its proximate side, a position information signal N=8 is outputted. It is to be understood that the position information detector 21 may output an analog signal which is converted into a digital signal by an A/D converter, not shown.

An aperture stop detector 22 is arranged within the lens-barrel 2 in association with the aperture stop 31 for detecting the opening condition of the aperture stop 31, if an aperture-priority-mode or a metered-manual-mode is selected, to output a signal E. In the illustrated embodiment, the signal E=1 is outputted when the F-number is within a range equal to or less than one and half steps with respect to the full opening aperture value (minimum F-number), while the signal E=0 is outputted when the F-number is within a range larger than one and half steps with respect to the full opening aperture value.

In the meantime, if a shutter-priority-mode or a program-mode or the like mode other than the above mentioned modes is selected, the signal E is set to be 0 or 1 on the basis of the F-number (Av) calculated by the CPU 7.

Incorporated in the lens-barrel 2 is a ROM 23 having stored therein information on the lens system 3, which includes the focal length of the lens system 3, the fact as to whether or not the position information detector 21 is provided in association with the lens system 3, and the like. Also stored in the ROM 23 are four constants A, B, C and D for use in calculation of a correction amount with respect to a spherical aberration of the lens system 3. These constants A, B, C and D are different from type to type of lens systems, and values most appropriate for correction of the spherical aberration are selected as the respective constants.

The position information detector 21 and the aperture stop detector 22 have respective output terminals which are connected to the ROM 23 whose output terminal is connected to the input port of the input/output interface 8 within the camera body 1. It is to be understood that the position information detector 21 and the aperture stop detector 22 may be connected directly to the input/output interface 8. In the illustrated embodiment, however, the outputs from the respective detectors 21 and 22 are inputted as they are to the input/output interface 8 through the ROM 23, in order to simplify the structure.

The operation of the autofocus camera constructed as above will be described below.

Fundamentally, the motor 15 is operated in accordance with defocus information calculated by the CPU 7 on the basis of the signal from the CCD 12, to rotate the focus ring 5 thereby reciprocatively moving the focus lens 3a along the optical path 30. In this manner, the autofocus adjustment is carried out. In this adjustment, however, the spherical aberration of the lens system 3 is not corrected.

As the motor 15 rotates to carry out the autofocus operation, the focus ring 5 rotates in response to the autofocus operation to move the focus lens 3a. The position information detector 21 detects the rotational angle of the focus ring 5 and outputs the position information signal N indicative of the position of the focus lens 3a. In this connection, processing is effected by the CPU 7 in such a manner that if the lens-barrel 2 is not provided with the position information detector 21, the position information signal N is set to be 3, while if a macro-region is provided at one end of a zoom area of a zoom lens and the lens system 3 is set to the macro-region, the position information signal N is set to be 8. At the same time, the aperture stop detector 22 detects the aperture of the lens system 3 set by the aperture stop 31, and output signals N and E are inputted into the input/output interface 8 of the microcomputer 6 via the ROM 23 arranged within the lens barrel 2.

Correction constants A, B, C and D are also inputted from the ROM 23 into the input/output interface 8. The correction constants are determined on the basis of the focal length, the F-number and the like of the lens system 3, in order to enable the spherical aberration of the lens system 3 to be corrected with minimum error.

The CPU 7 calculates the correction amount of the spherical aberration, on the basis of the inputted data N, A, B, C and D. Since the spherical aberration varies also depending upon the F-stop value of the aperture stop 31, the CPU 7 calculates the correction amount in accordance with first and second equations different from each other, on the basis of the setting state of the aperture stop 31. That is, if the aperture is within a range equal to or less than one and one half steps with respect to the full opening aperture value, the CPU 7 calculates the correction amount in accordance with the following equation:

$$\text{Correction amount} = AN + B \qquad (1)$$

On the other hand, if the F-number is within a range larger than one and one half steps with respect to the full opening aperture value, the CPU 7 calculates the correction amount in accordance with the following equation:

$$\text{Correction amount} = CN + D \qquad (2)$$

A correction signal representative of the correction amount obtained by the calculation in accordance with any one of the above equations (1) and (2) is outputted from the CPU 7 to the drive circuit 14 through the input/output interface 8. In response to the correction signal, rotation of the motor 15 is controlled to slightly move the focus lens 3a along the optical path 30 such that an image position is moved by the correction amount. In this manner, deviation of the in-focus position caused by the spherical aberration of the lens system 3 is corrected in succession in the focusing operation described above.

In the illustrated embodiment, it is possible to correct not only the spherical aberration which varies with a change in the position of the focus lens 3a, but also the spherical aberration which varies with a change in the F-number.

When the above equations (1) and (2) are used, the constants A through D will be brought to positive or negative values, depending upon the type of the lens system. Accordingly, for example, the equation (1) may be replaced by the following equation:

$$\text{Correction amount} = (A' - a)N + (B' - b)$$

In this case, the constants a and b are stored in the ROM 10 on the side of the camera body 1, and are selected such that the constants A' and B' as well as C' and D' stored in the ROM 23 on the side of the lens-barrel 2 are always brought to positive values. By doing so, it is made possible to reduce the storage capacity of the ROM 23 incorporated in the lens-barrel 2.

Figure 2:
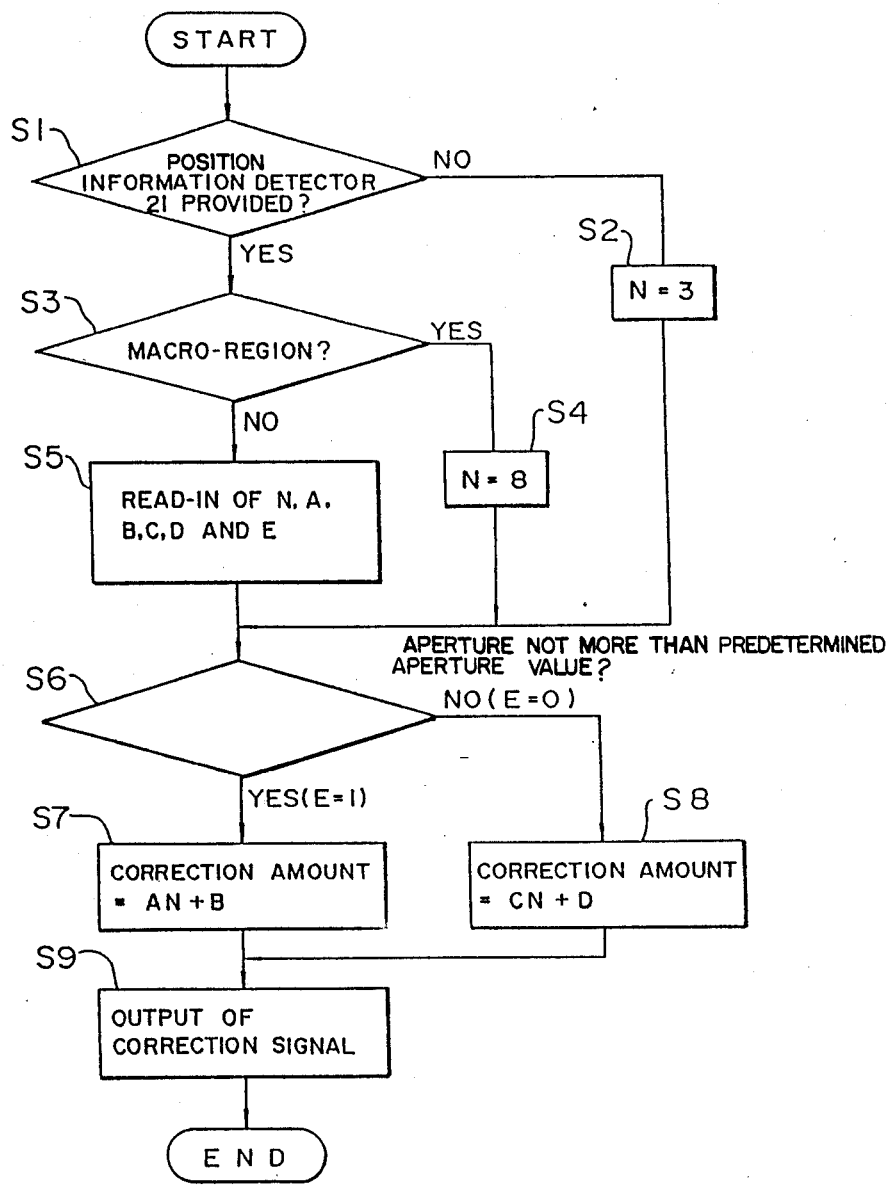

FIG. 2 shows a flow chart of a program stored in the ROM 10 of the microcomputer 6. The program will next be described.

At step S1, it is first judged whether or not the lens-barrel 2 is provided with the position information detector 21. If the judgement at the step S1 is negative, the position information signal N is set to 3 at a step S2, and the program proceeds to a step S6. On the other hand if, the judgement at the step S1 is affirmative, the program proceeds to a step S3 where it is judged whether or not the lens system 3 is set to the micro-region. If the judgement at the step S3 is affirmative, the position information signal N is set to 8 at a step S4, and the program proceeds to the step S6. If it is judged at the step S3 that the lens system 3 is not set to the macro-region, the program proceeds to a step S5 where the position signal N, the constants A, B, C and D, and the signal E are read in, and the program proceeds to the step S6.

At the step S6, the setting state of the aperture stop 31 is judged. Specifically, if the F-stop value is within a range equal to or less than one and one half steps with respect to the full opening aperture value, that is, if the signal E is 1, the program proceeds to a step S7 where the CPU 7 calculates the correction amount in accordance with the above equation (1), that is, the correction amount is AN+B. The correction signal representative of the correction amount obtained by the calculation in accordance with the equation (1) is outputted at the step S9. On the other hand, if it is judged at the step S6 that the F-stop value is within the range larger than one and one half steps with respect to the full opening aperture value, that is, if the signal E is 0, the program proceeds to a step S8 where the CPU 7 calculates the correction amount in accordance with the equation (2), that is, the correction amount is CN+D. The correction signal representative of the correction amount obtained by the calculation in accordance with the equation (2) is outputted at the step S9.

The arrangement of the illustrated embodiment is such that the correction amount is calculated on the basis of the distance information signal N and the constants A, B, C and D. By this arrangement, it is made possible to reduce the storage capacity of the ROM 23 within the lens-barrel 2. It is to be understood, however, that a ROM having a high storage capacity may be used such that correction amounts set beforehand in consideration of various positions of the focus lens 3a and various values of the aperture are entirely stored in the ROM. In addition, the distance information may be detected by the rotational angle detector 20 within the camera body 1 to obtain the distance information signal N from the detected distance information.

Moreover, as the in-focus position moves in response to the focusing operation, the conditions of the autofocus also vary. Accordingly, when the distance information signal N changes the focusing operation, the focusing conditions are re-judged thereby making it possible to increase the focusing accuracy.

In the meantime, if a focus indicator 40 is provided while the focus ring 5 is arranged to be manually operated, the focus indicator 40 may be arranged to indicate an in-focus state when the total amount of the defocus amount and the correction amount are cleared by the manual operation of the focus ring 5.

As described above, according to the autofocus camera of the invention, the correction amount can vary with a change in the position of the focus lens to correct the spherical aberration of the lens system. Thus, the invention is advantageous in that even if the position of the focus lens varies, there can always be obtained clear or sharp photographs which are in accurate focus.

What is claimed is:

1. An autofocus camera comprising:
   a photographing lens system including at least one focus lens reciprocatively movable along a predetermined optical path;
   drive means for reciprocatively moving said focus lens along said optical path;
   means for detecting a position of said focus lens and for outputting a signal representative of position information;
   means for calculating, on the basis of said position information outputted from said position detecting means, a correction amount with respect to a spherical aberration of said lens system at said detected position and for outputting a signal representative of the calculated correction amount; and
   control means for controlling said drive means on the basis of said signal outputted from said calculating means so as to cause said drive means to move said focus lens to a position where said spherical aberration of said lens system is corrected.

2. The autofocus camera according to claim 1 which further comprises:
   means for setting an aperture of said lens system; and
   means for detecting said aperture of said lens system set by said aperture setting means, and for outputting a signal representative of said detected aperture value,
   wherein said calculating means calculates said correction amount on the basis of said signal outputted by said position detecting means and said signal outputted by said aperture stop detecting means.

3. The autofocus camera of claim 2 wherein said photographing lens system is detachably mounted to a camera body provided with a memory means, said calculating means using constants stored in said memory means.

4. The autofocus camera according to claim 3 wherein said calculating means calculates said correction amount in accordance with a first equation (A * N)+B in the case where said detected aperture value is not more than a predetermined value where:
   A is a first constant;
   N is a predetermined value for a respective one of a divided zone; and
   B is a second constant and wherein said calculating means calculates said correction amount in accordance with a second equation (C * N)+D in the case where said detected aperture value is more than said predetermined value where:

C is a third constant; and

D is a fourth constant.

5. The autofocus camera according to claim 4 wherein said calculating means calculates said correction amount in accordance with said equations, the value representing N being replaced with a predetermined fixed value when said autofocus camera is operated under a macro mode.

6. The autofocus camera according to claim 2, wherein said calculating means includes means for judging whether said signal outputted by said aperture detecting means indicates that said aperture of said lens system set by said aperture setting means is at most equal to a predetermined value with respect to a full opening aperture value, and wherein said calculating means calculates said correction amount in accordance with a first equation when the judgement of said judging means is affirmative, and calculates said correction amount in accordance with a second equation different from said first equation when the judgment of said judging means is negative.

7. The autofocus camera according to claim 1 which further comprises:

memory means having stored therein information for use in the calculation of said correction amount by said calculating means, wherein said position detecting means is connected to said calculating means through said memory means.

8. The autofocus camera according to claim 7 wherein said photographing lens system is detachably mounted to a camera body, and wherein said memory means is arranged inside of said camera body.

9. The autofocus camera according to claim 2 which further comprises:

memory means having stored therein information for use in the calculation of said correction amount by said calculating means, wherein said position detecting means and said aperture detecting means are connected to said calculating means through said memory means.

10. The autofocus camera according to claim 9 wherein said photographing lens system is detachably mounted to a camera body, and wherein said memory means is arranged inside of said camera body.

11. The autofocus camera according to claim 1 wherein said photographing lens system is detachably mounted to a camera body and is provided with a memory means, and wherein said calculating is executed with use of constants stored in a memory means.

12. The autofocus camera according to claim 11 wherein said calculating means is arranged inside said camera body, and wherein said constants stored in said memory means are selected such that said signal representative of said position information are brought to positive values.

13. The autofocus camera according to claim 12 wherein said calculating means calculates said correction amount according to an equation:

(First Constant * N)+Second Constant, where N is a predetermined value for one of said divided zones.

14. The autofocus camera of claim 13 wherein said calculating means calculates said correction amount in accordance with said equation, the value representing N being replaced with a predetermined fixed value when said autofocus camera is operated under a macro mode.

15. The autofocus camera according to claim 12 wherein said calculating means calculates said correction amount in accordance with a first equation (A * N)+B in the case where said detected aperture value is not more than a predetermined value where:

A is a first constant;

N is a predetermined value for a respective one of a divided zone; and

B is a second constant and wherein said calculating means calculates said correction amount in accordance with a second equation (C * N)+D in the case where said detected aperture value is more than said predetermined value where:

C is a third constant; and

D is a fourth constant.

16. The autofocus camera according to claim 15 wherein said calculating means calculates said correction amount in accordance with said equations, the value representing N being replaced with a predetermined fixed value when said autofocus camera is operated under a macro mode.

17. The autofocus camera according to claim 1 wherein said focus lens reciprocatively moves in a predetermined range of said optical path, and said position detecting means detects said position of said focus lens within a plurality of divided zones of said range.

18. The autofocus camera according to claim 1 which further comprises:

a camera body;

a lens-barrel detachably mounted to said camera body;

a focus ring mounted on said lens-barrel for rotation relative to said lens-barrel said focusing being drivingly connected to said drive means; and a lens frame having carried thereon said focus lens, said lens frame being threadedly engaged with said focus ring and being reciprocatively moved relative to said focus ring along said optical path when said focus ring is rotatably driven by said drive means, wherein said position detecting means is arranged within said lens-barrel for detecting the rotational angle of said focus ring in order to output said signal that is representative of said position information.

19. The autofocus camera according to claim 17 wherein said calculating means calculates said correction amount according to an equation:

(First Constant * N)+Second Constant, where N is a predetermined value for one of said divided zones.

20. The autofocus camera of claim 19 wherein said calculating means calculates said correction amount in accordance with said equation, the value representing N being replaced with a predetermined fixed value when said autofocus camera is operated in a macro mode.

21. An autofocus camera comprising:

a photographing lens system including at least one focus lens reciprocatively movable along a predetermined optical path;

drive means for reciprocatively moving said focus lens along said optical path;

means for detecting a position of said focus lens in order to output a signal representative of position information;

means for setting an aperture of said lens system;

means for detecting said aperture of said lens system set by said aperture setting means, and to output a signal representative of aperture information;

memory means having stored therein a plurality of correction amounts corresponding to said position information signal and said aperture information signal; and means for controlling said drive means on the basis of the correction amount stored in said memory means in accordance with the position detected by said position detecting means and said aperture detected by said aperture detecting means so as to cause said drive means to move said lens to a position where a spherical aberration of said lens system is corrected.

* * * * *

UNITED STATES PATENT AND TRADEMARK OFFICE
CERTIFICATE OF CORRECTION

PATENT NO. : 4,890,133

DATED : December 26, 1989

INVENTOR(S) : R. OGAWA et al.

It is certified that error appears in the above-identified patent and that said Letters Patent is hereby corrected as shown below:

Column 1, line 13, change "a" to ---the--- after "upon".
Column 1, line 13, change "the" to ---a--- after "of".
Column 1, line 21, insert ---to--- after "order".
Column 2, line 9, change "diagramattic" to ---diagrammatic---.
Column 2, line 30, change "lens barrel" to ---lens-barrel---.
Column 2, line 44, change "13" to ---12---.
Column 3, line 27, insert ---one--- before "half".
Column 3, line 31, insert ---one--- before "half".
Column 4, line 21, change "lens barrel" to ---lens-barrel---.
Column 5, line 22, change "if," to ---, if---.
Column 5, line 25, change "micro-" to ---macro- ---.
Column 5, line 55, change "distance" to ---position---.
Column 5, line 63, change "distance" to ---position---.
Column 5, line 65, change "distance" to ---position---.

UNITED STATES PATENT AND TRADEMARK OFFICE
CERTIFICATE OF CORRECTION

PATENT NO. : 4,890,133

DATED : December 26, 1989

INVENTOR(S) : R. OGAWA et al.

It is certified that error appears in the above-identified patent and that said Letters Patent is hereby corrected as shown below:

Column 5, line 66, change "distance" to ---position---;

Column 6, line 1, change "distance" to ---position---.

Signed and Sealed this

Twenty-second Day of October, 1991

Attest:

HARRY F. MANBECK, JR.

*Attesting Officer*      Commissioner of Patents and Trademarks